(12) United States Patent
Menezes et al.

(10) Patent No.: US 10,459,648 B1
(45) Date of Patent: Oct. 29, 2019

(54) CHANGE RATE ESTIMATION

(71) Applicant: EMC Corporation, Hopkinton, MA (US)

(72) Inventors: Guilherme Menezes, Santa Clara, CA (US); Abdullah Reza, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 641 days.

(21) Appl. No.: 14/968,416

(22) Filed: Dec. 14, 2015

(51) Int. Cl.
*G06F 3/06* (2006.01)

(52) U.S. Cl.
CPC ............ *G06F 3/0641* (2013.01); *G06F 3/065* (2013.01); *G06F 3/067* (2013.01); *G06F 3/0608* (2013.01); *G06F 3/0619* (2013.01); *G06F 3/0643* (2013.01)

(58) Field of Classification Search
CPC ...... G06F 3/0641; G06F 3/0643; G06F 3/065; G06F 3/067
See application file for complete search history.

(56) References Cited

U.S. PATENT DOCUMENTS

| | | | |
|---|---|---|---|
| 6,513,050 B1 * | 1/2003 | Williams | G06F 11/1451 |
| 6,928,526 B1 * | 8/2005 | Zhu | G06F 3/0608 711/118 |
| 7,478,113 B1 * | 1/2009 | De Spiegeleer | G06F 11/1453 |
| 8,612,696 B2 | 12/2013 | Zhu et al. | |
| 8,635,184 B2 | 1/2014 | Hsu et al. | |
| 2002/0087822 A1 * | 7/2002 | Butterworth | G06F 3/0608 711/170 |
| 2008/0172430 A1 * | 7/2008 | Thorstensen | G06F 3/0608 |
| 2012/0239691 A1 * | 9/2012 | Jaquette | H04N 21/2181 707/770 |
| 2014/0244599 A1 * | 8/2014 | Zhang | G06F 3/0608 707/692 |
| 2014/0310499 A1 * | 10/2014 | Sundararaman | G06F 12/0269 711/203 |

FOREIGN PATENT DOCUMENTS

| | | | |
|---|---|---|---|
| WO | WO-2008008183 | A2 | 1/2008 |
| WO | WO-2008008183 | A3 | 10/2008 |

* cited by examiner

*Primary Examiner* — Kris E Mackes
*Assistant Examiner* — Lin Lin M Htay
(74) *Attorney, Agent, or Firm* — Womble Bond Dickinson (US) LLP

(57) ABSTRACT

File measurements are computed and stored in persistent memory of a deduplicated storage system as files are written or on demand, where the file measurements are used to estimate storage requirements for storing a subset of files. The file measurements are accumulated into an initial measurement at a first point in time and a final measurement at a second point in time to obtain an estimate of any change in a quantity of unique segments required to store the subset of files in the deduplicated storage system between the first and second points in time. Future storage requirements can be estimated based on a computed rate of change in the amount of storage required to store the subset of files between the first and second points in time.

19 Claims, 9 Drawing Sheets

CHANGE RATE ESTIMATION

FIELD OF THE INVENTION

Embodiments of the present invention relate generally to data storage systems. More particularly, embodiments of the invention relate to estimating storage requirements for data storage systems using deduplication.

BACKGROUND

In data storage systems space is allocated for storing a primary set of user data. Additional storage may be allocated in connection with providing data protection for the primary set of data. Data protection preserves a copy of data at one or more points in time. For example, data protection can include snapshot and/or data replication facilities that generate a backup copy of the primary data. The copy provides protection against data loss in the event of primary data failure.

In a protection storage file system, such as the data protection file systems of EMC Corporation, a file may be protected with several snapshots taken at regular intervals over a given retention period. For example, a given file may be protected for 30 days for backup purposes. If the file has a backup policy of one snapshot a day, then 30 snapshots of the file will be taken and stored in the file system.

The amount of primary storage in a file system may vary over time. The amount of additional storage needed for data protection also varies over time. Allocating too much or too little risks data loss, inefficient storage utilization and/or an increase in the cost of storage.

One technique for determining data protection storage requirements is to estimate a rate of change in the amount of storage used for protecting primary data during a desired retention period, i.e. the amount of time that a copy or copies of the data providing the protection is retained. In a simple protection system where the data is simply copied, the task of determining the amount of storage needed for protection is fairly straightforward—simply multiply the amount of data being copied by the number of copies being retained. But in most modern data protection storage systems storage is conserved by not simply copying the data, but rather by tracking changes to the data, such as by capturing a delta or generating a change log. Thus, in modern data protection systems, the storage requirements are typically determined based on the rate at which the data changes over the course of the retention period.

In the context of a file system with data deduplication, however, the task of determining the rate at which the data changes presents particular challenges. In deduplication file systems a file may be split into hundreds of millions of segments during the write process. Any segment shared between the file being written and any other file is not re-written, but rather recorded in the file's offsets in order to optimize capacity utilization. This makes it difficult to determine how much data was changed without reconstituting the stored file.

Even though deduplication file systems maintain an index that maps any offset of any file to a segment, they typically do not maintain the opposite mapping, i.e. a map from the segment to the file. This is because all of the files in the system can potentially share a segment. Keeping an index data structure per segment would require a prohibitively large amount of storage given that a file system may contain hundreds of billions or more segments.

The task of determining the rate at which the data changes is even more complex when the change rate being determined is for a subset of files, such as files belonging to a particular client of a shared storage system. For example, different clients may issue a different sequence of operations on top of different files resulting in a different amount of overall changed bytes over the course of a given time period in a shared storage system. In a file system with data deduplication and data protection this translates into different amounts of used capacity over the course of a data protection retention period from one client to the next. Estimating the amount of changed bytes in files for a specific client is essential to correctly size the capacity of the file system for each client.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
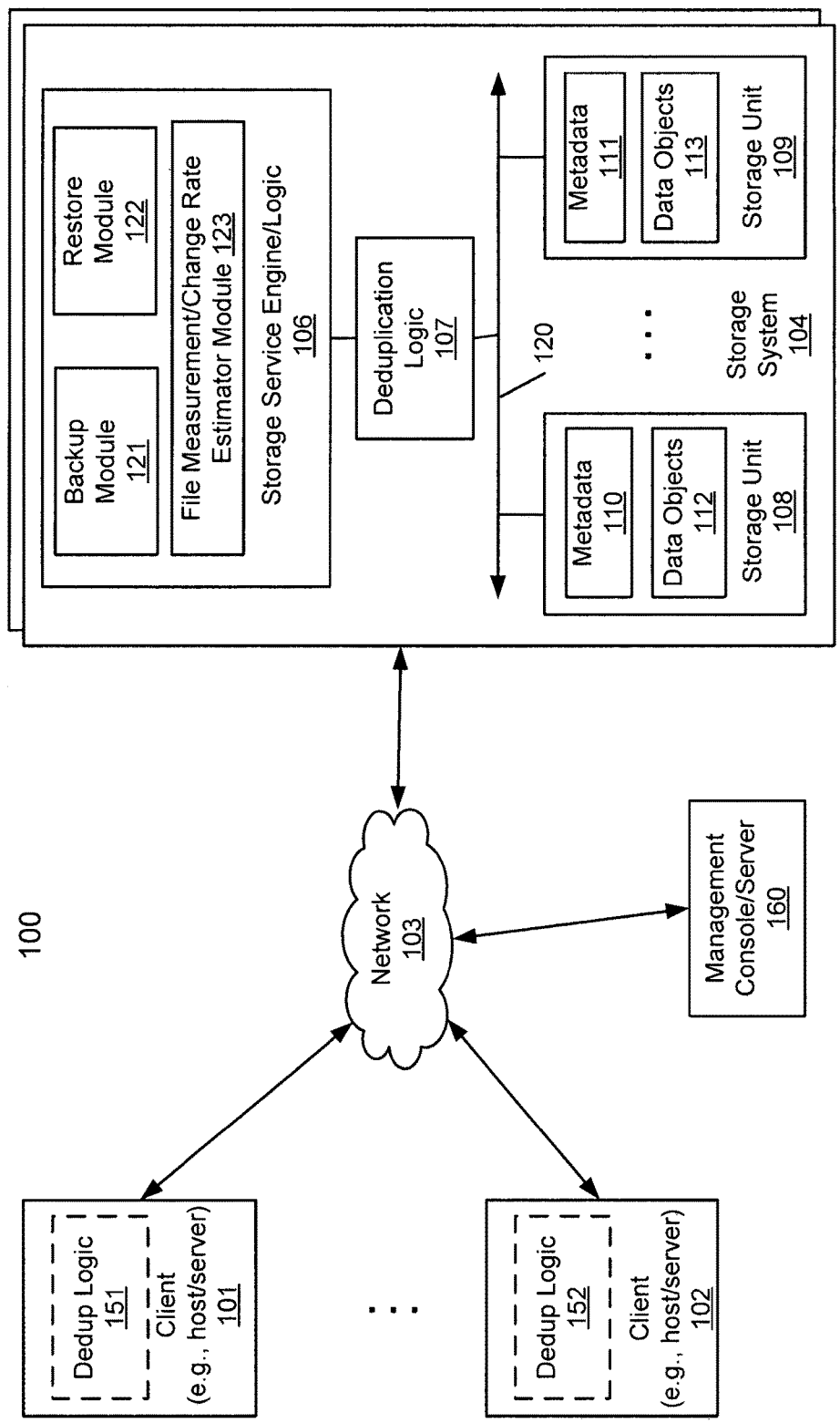
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Measuring and estimating the amount of physical bytes required to store a set of files facilitates optimizing the capacity of a file system over time. Among other uses, an accurate estimate of the amount of physical bytes required to store protected files can be used to optimize data protection storage capacity over time.

The changed bytes for a set of files can be defined as how many bytes of data were added, deleted or overwritten between time Ti and Tj for a set of N files $\{F1, F2, \ldots, FN\}$. The change rate can be a characteristic of the sequence of operations a client may issue to the file system. Each client typically exhibits a specific sequence of create, delete, and write operations with specific parameters. For example, a database application can be run on top of the file system, in which case updates to the database tables will be mapped to a specific sequence of changes to the file system files.

In a protection storage file system a file F may be backed up in several snapshots for a given retention period RT. The file F may be kept for 30 days for backup purposes. If the file has a backup policy of one snapshot a day, then 30 snapshots of the file will be kept in the file system. In general, a file F will have a maximum number of snapshots K at any point in time $\{FT1, FT2, \ldots, FTK\}$. The changed bytes between time Ti and Tj for $1 \leq i,j \leq K$ is referred to as changed bytes ($F_{Ti}$, $F_{Tj}$).

In the context of data deduplication, changed bytes($F_{Ti}$, $F_{Tj}$) is not an actual amount of changed bytes, but is rather an upper bound estimate of how many bytes were written between time Ti and time Tj for file F. This is because any segment shared between the file at Ti and the file at Tj ($F_{Ti}$, and $F_{Tj}$) is not re-written in order to optimize capacity utilization using data deduplication. For example, if K snapshots are to be kept for file F, then changed_bytes($F_{T1}$, $F_{TK}$) will be an upper bound estimate of how many bytes of capacity should be allocated in a data protection system in order to accommodate all K snapshots of F.

Estimating the changed_bytes($F_{Ti}$, $F_{Tj}$) for any file F is difficult in the context of deduplication because the inexistence of a mapping from segments to files makes it very expensive to find out if a segment s belongs to a earlier version of file F1 (such as a previous snapshot of a file F1) or to any other arbitrary file F2 in the file system. Therefore, this makes the task of tracking changes between $F1_{Ti}$ and $F1_{Tj}$ as files are written a very expensive task.

Furthermore, the task of estimating the changed_bytes not only for a file F1 across time but for any set of N files $\{F1, F2, \ldots, FN\}$ is a complex one in the context of a file system with data deduplication. The reason is because any segment of a given file F1 may be also shared by any number of arbitrary files inside the set $\{F2, \ldots, FN\}$.

For example, a new segments added to file F1 at time T2 (that is, the segment is present in F1T2 but not inside F1T1) may also be present in a file F2 at both time T1 and T2. Even though segment s will be considered changed data for F1, it will not be considered changed data for set $\{F1, F2\}$ since it will be present in this set in both time Ti and T2. In practice this means that even though segments may be a new segment in the context of F1, it will not be written to the system when F1T2 is being written since the deduplication algorithm will find it is already in the system because of F2.

According to some embodiments, a change rate estimator overcomes the challenges of estimating changed_bytes in the context of deduplication by generating file measurements that approximate a number of unique segments belonging to a file F at any two points in time and estimating a change rate in the amount of physical bytes used for storing file F over time based on the generated file measurements.

In one embodiment, a file measurement process measures a file F in a file system with data deduplication and segmentation. The file F can be measured on demand or when the file is initially written to the file system. The file need only be measured again if the file is changed. Each file measurement $B_F$ represents an approximation of how many unique segments belong to file F at the time of measurement. The file measurements $B_{F1}, \ldots B_{FN}$ form the basis of subsequent estimates of the amount of changed_bytes between any two points in time for any ad-hoc subset of N files F in a file system with data deduplication and segmentation.

In one embodiment, a change estimation process accumulates, at a first point in time Ti in a combined bitmap $B_i$, and again at a second point in time Tj in a combined bitmap $B_j$, the individual file measurements $B_F$ of each file F in a subset of N files. When the accumulation of file measurements is complete, the change estimation process uses the combined bitmaps Bi and Bj to derive an estimate of the sizes of the entire subset of N files F at the respective points in time.

In one embodiment the estimate of the sizes is derived from the file measurements $B_F$ accumulated in the combined bitmaps Bi and Bj by approximating how many unique segments collectively belong to the entire subset of N files F at time Tj compared to how many belonged at time Ti, and multiplying the amount of change in the number of unique segments by a pre-defined average segment size. For example, in some cases the number of unique segments may increase at the end of the time period Tij, while in other cases the number of unique segments may decrease or be unchanged. The upper bound estimate of how much capacity is needed to fit the entire subset of N files written during time period Tij is a function of the changed unique segments, where the changed unique segments is the sum of the unique segments both added and deleted between Ti and Tj.

In one embodiment, using the approximated sizes of the number of unique segments, the change estimation process further calculates a rate at which the combined file measurements $B_F$ of the entire subset of N files have changed over time, the change rate being expressed as a unit of storage, such as a byte, per unit of time, such as a day, e.g. 8 MB per day.

In one embodiment, each individual file measurement $B_F$ is stored in memory in a bitmap vector B containing a set S of ones and zeroes representing an approximation of how many unique segments belong to file F at the time the file is measured. In one embodiment, file measurement $B_F$ is stored as a bloom filter with a single hash function that uniformly distributes the set S of ones and zeroes across the bitmap vector B. The bitmap vector B is initially a set of all zeroes. A unique segment s belonging to the file F is mapped to a particular bit location in the bitmap vector B using an algorithm to insert(s, S) using the bloom filter with the single hash function and bitmap B:

function insert(segment $s$)

$B[\text{hash}(s)]=1$

The bit value at the B[hash(s)] location in the bitmap vector B is flipped from zero to one in order to represent that an element was added to the set S of ones and zeroes, i.e. that the unique segment s is mapped to that particular bit location in bitmap vector B and belongs to file F.

Bloom filters allow a small number of false positive lookups to occur. In other words a lookup function, lookup (s1, S), might return "true" even if the segment s1 was never inserted into S. For example, if another segment s2 was also inserted into S such that there is a hash function conflict, i.e., hash(s1)=hash(s2), then there can be a false lookup for s1. For file measurement purposes, however, it is not necessary to use a lookup function because there is no need to determine which unique segments belong to file F, but rather only how many.

For this reason the probability of a false positive lookup need not be low as long as the probability can be analytically estimated with high confidence. A high level of confidence can be achieved when the hash function hash(s) uniformly distributes the ones and zeroes across the entire bitmap B. In this manner, storing file measurement $B_F$ as a bloom filter with a uniform distribution of the set of ones and zeroes advantageously facilitates counting the approximate number of unique segments that belong to file F, i.e. the approximate number of bits set to one in the bitmap B, based on the size M of the bitmap B and the proportion z of bits set to zero in the bitmap B relative to M.

In one embodiment, because the file measurement $B_F$ represents an approximation of how many unique segments belong to the file F at the time the file is measured (as opposed to an exact accounting of which unique segments belong to the file F), the bloom filter size M of the bitmap B can be set to a small enough value for compact representation of file measurement $B_F$ in memory (or on disk) while retaining a high load factor in terms of how many unique segments can be represented in any bitmap B relative to M. In this manner, storing the file measurement $B_F$ in memory requires only a small number of bits per segment without significantly compromising the accuracy of file measurement $B_F$.

In one embodiment, further reductions in the size of the bitmap B are obtained using sampling to reduce the number of unique segments represented in bitmap B for file F. In one embodiment, sampling is based on a rate 1/R to sample only one segment in each R segments of file F. In one embodiment, sampling is based on a sampling pattern applied to a content of the sampled segments (as opposed to random sampling). In this manner sampling ensures that a fair representation is obtained of the number of unique segments belonging to file F regardless of the frequency with which any particular segment occurs so as not to significantly compromise the accuracy of file measurement $B_F$.

In one embodiment, various input parameters for the file measurement and change estimation processes are used to optimize the storage requirements associated with the processes while maintaining processing efficiency. For example, the various parameters can include a global size M for the individual file measurement bitmaps $B_F$ and the combined bitmaps $B_i$ and $B_j$, a sampling rate R for sampling the unique segments in a file F during generation of the individual file measurement bitmaps $B_F$, and an average segment size for estimating the change in the physical size of any subset of N files F1, . . . FN, based on the file measurements represented in individual file measurement bitmaps $B_F$ and accumulated into combined bitmaps $B_1$, $B_j$.

In one embodiment, the file measurement and change estimation processes are performed for a pre-selected subset of N files {F1, F2, . . . FN}, where the subset of N files is any ad hoc collection of files F associated with a particular client, tenant, application and the like. In one embodiment, the first and second points in time at which the change rate estimates are performed are based on a beginning and ending times Tij associated with a desired retention period RT for data protection.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), deduplication logic 107, and one or more storage units or devices 108-109 communicatively coupled to each other.

Storage service engine 106 may represent any storage service related components configured or adapted to provide storage services (e.g., storage as a service) to a variety of clients using any of the access protocols set forth above. For example, storage service engine 106 may include backup logic 121, restore logic 122 and file measurement/change rate estimator logic 123.

In one embodiment, backup logic 121 is configured to receive and back up data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into data objects 112/113 in the form of multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files 112/113 are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In response to a data file to be stored in storage units 108-109, according to one embodiment, a file measurement/change rate estimator logic 123 is configured to measure any files subject to deduplication on demand or at the time they are written. The types of files that are measured include any subset of files, for example, files receiving data protection services, such as files having point-in-time snapshot copies retained over a period of time where the files and file snapshots are stored using data deduplication (as described in further detail below).

In one embodiment, the file measurement/change rate estimator logic 123 is further configured to estimate the rate of change in the size of any subset of files based on the file measurements of the files and various input parameters, such as a time period over which the rate of change is to be determined, including for example, a retention period for protected files. The estimated change rate is used to manage storage capacity for storage services, including storage capacity for data protection services. Additional details of the file measurement/change rate estimator logic 123 are described with reference to FIGS. 2-6.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 are configured to perform local deduplication operations, respectively. For example, prior to transmit data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

In one embodiment, storage system 104 further includes a storage manager or storage controller (not shown) configured to manage storage resources of storage system 104, such as, for example, storage space and processing resources (e.g., processor, memory, network resources). An administrator of management console or server 160 may access the storage manager or controller remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Figure 2:
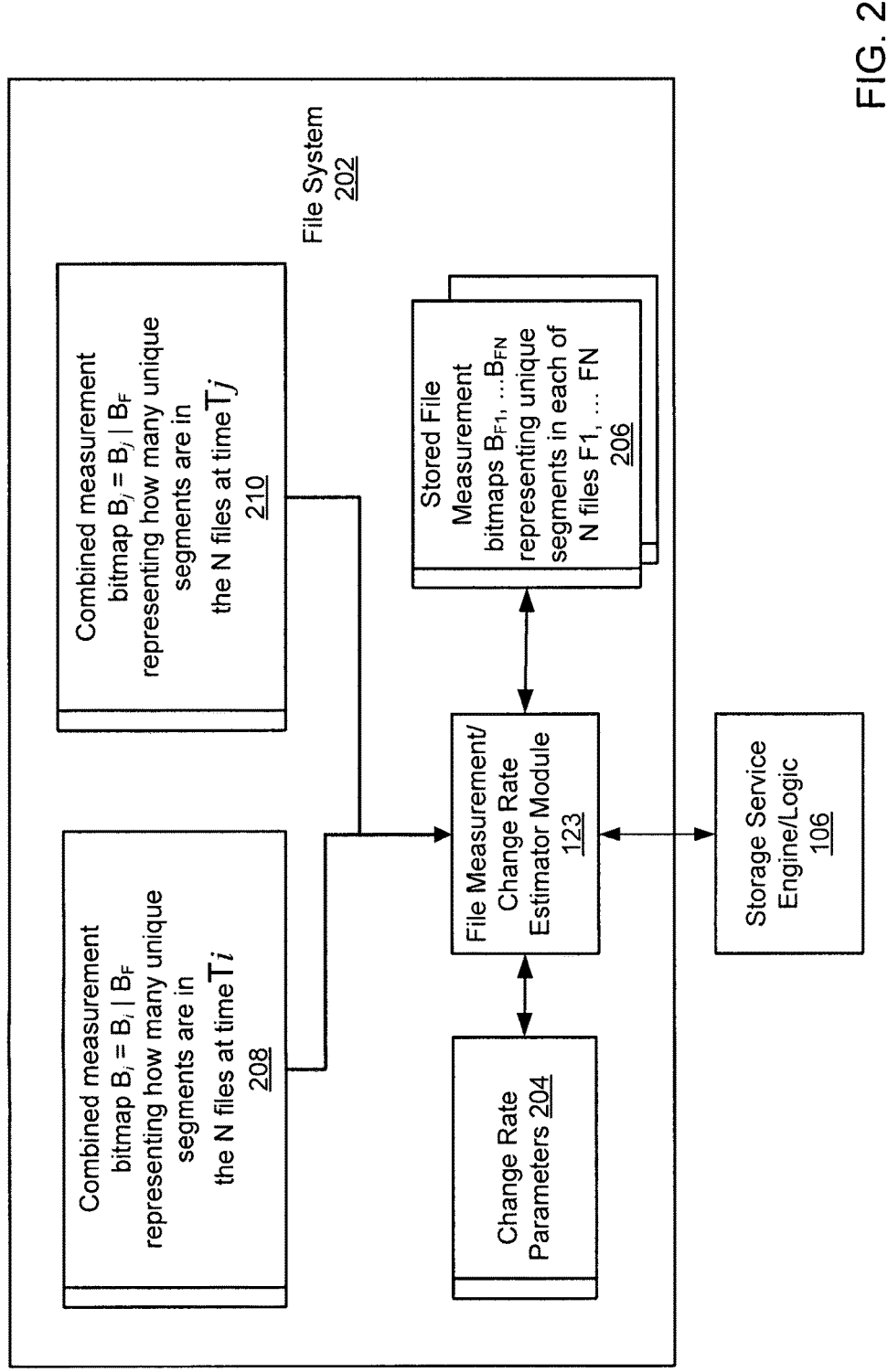
FIG. 2 is a block diagram illustrating a storage system in further detail according to one embodiment of the invention.

FIG. 2 is a block diagram illustrating further details of storage system 200 including a protection file system 202 having the storage service engine 106 and the file measurement/change rate estimator logic 123.

In one embodiment, the file measurement portion of logic 123 is a process by which the storage system 200 measures each file F in a subset of N files F1, F2, . . . FN by generating and storing file measurement bitmaps $B_{F1}, \ldots B_{FN}$ 206 in persistent storage, either on disk or in memory. Each file measurement bitmap $B_F$ represents an approximation of how many unique segments belong to file F at the time of measurement. The file F can be measured on demand or when the file is initially written to the file system. The file need only be measured again if the file is changed. The subset of N files F1, F2, . . . FN can be any ad hoc set of N files, such as those for a particular client or associated with a tenant ID and the like. Additional details of the file measurement portion of logic 123 are described with reference to FIGS. 3-4.

The change rate estimation portion of logic 123 is a process by which a storage system 200 including protection file system 202 estimates the amount of changed_bytes between any two points in time, Ti and Tj, i<j, for any given subset of N files {F1, F2, . . . , FN} in the context of data deduplication.

In view of the difficulty in calculating the actual amount of changed_bytes (due to the magnitude of the amount of data stored in the storage system), the amount of changed_bytes is instead estimated based on the previously stored file measurement bitmaps $B_{F1}, \ldots B_{FN}$ 206 for the subset of N files {F1, F2, . . . , FN}. In a typical embodiment, the file measurement bitmaps $B_F$ are fetched from persistent storage or, if needed, are newly generated for any files F that have not yet been measured at the time the change rate estimation logic 123 is being performed. Further details of the change rate estimation logic 123 are described with reference to FIG. 5 and FIGS. 6a-6b.

In one embodiment, the file measurement/change rate estimation logic 123 receives as input various change rate parameters 204 that control how the file measurement/change rate estimation logic 123 is implemented. For example, the file measurement process receives an identification of any ad hoc set of N files {F1, F2, . . . , FN} for which change rate estimation is to be performed, period of time over which change rate estimation is performed, such as a retention time RT for data protection services, a sampling rate R for generating the file measurements $B_F$, the average segment size for determining the physical amount of changed bytes, and the global bitmap size M which defines a uniform size for each of the bitmaps used to store the individual file measurements 206 and the combined file measurements 208/210. The change rate estimation input parameters 204 are summarized in Table 1.

TABLE 1

| | |
|---|---|
| 1. | A set of N files {F1, F2, . . . , FN}. |
| 2. | A time period defined by Ti and Tj in which Ti < Tj, such as a retention time (RT) for retaining snapshots of a file F. |
| 3. | The sampling rate R for traversing the unique segments during file measurement. |
| 4. | The average segment size (avg_s_size) to obtain the amount of physical bytes used to store the unique segments belonging to a file F (or any subset of N files F). |
| 5. | The global bitmap size M for the bitmaps B used to compute the individual and combined file measurements. |

Figure 3:
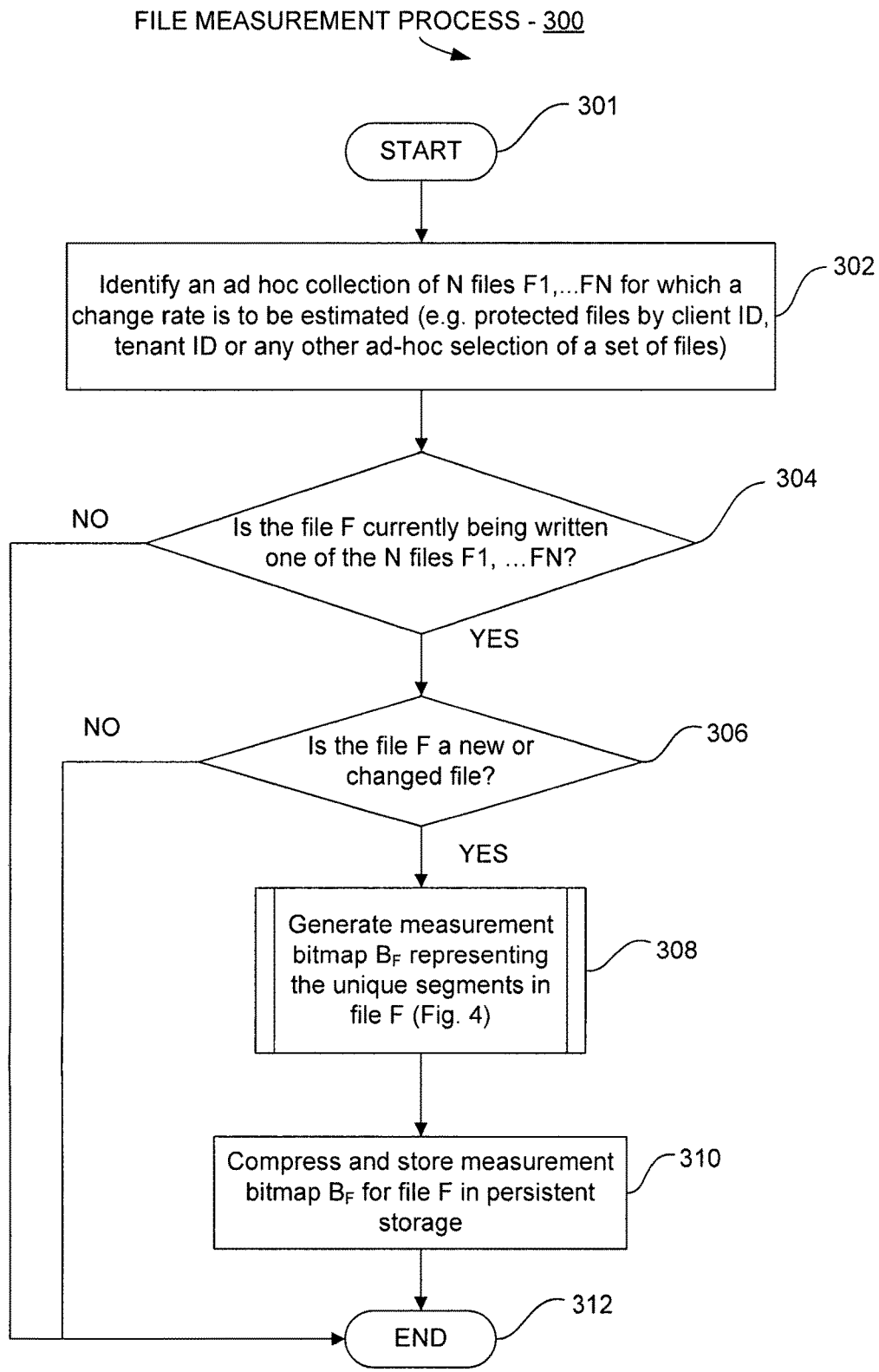
FIG. 3 is a flow diagram illustrating processes for change rate estimation in a storage system according to one embodiment of the invention.
Figure 4:
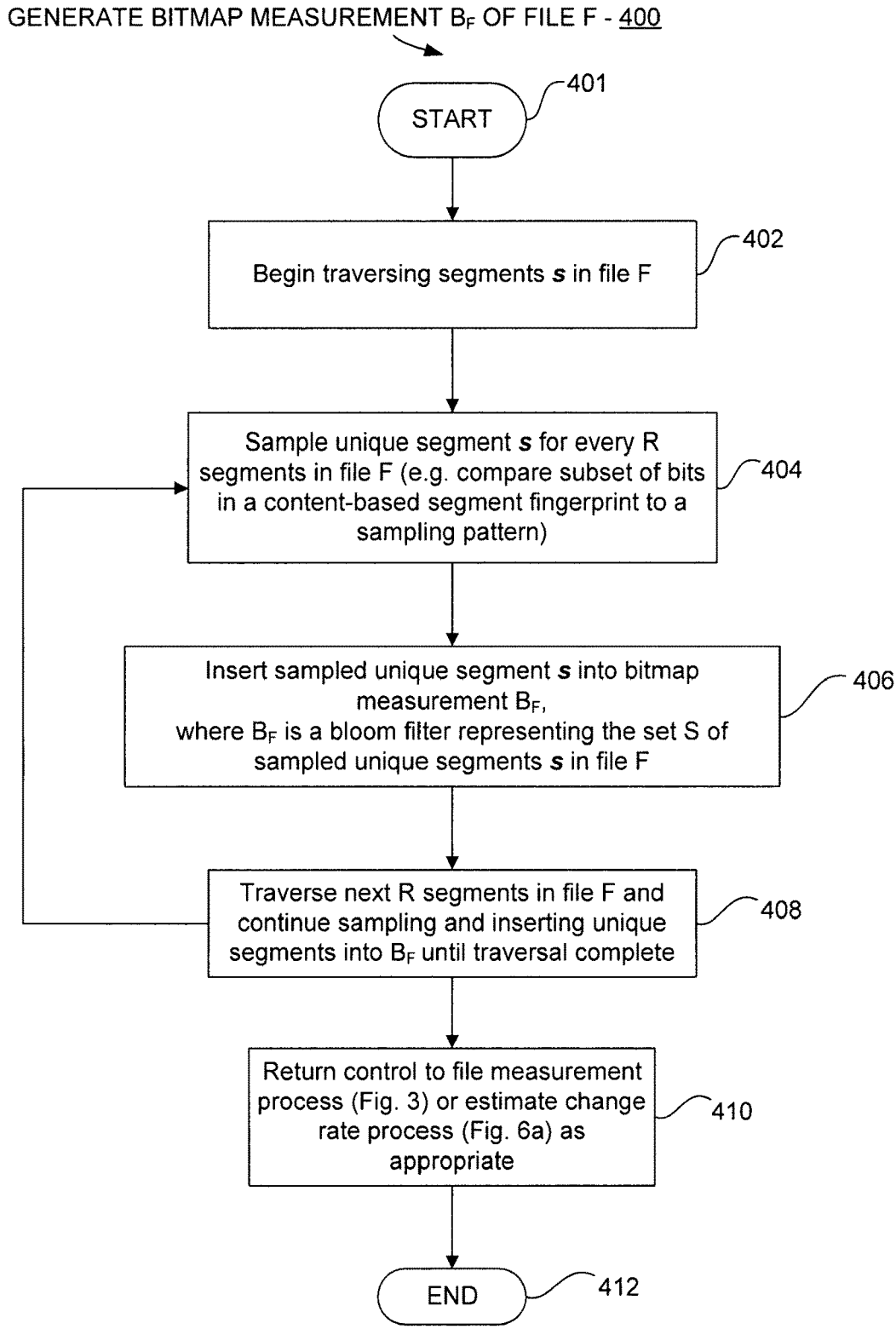
FIG. 4 is a flow diagram illustrating processes for change rate estimation in a storage system according to one embodiment of the invention.

FIGS. 3-4 are flow diagrams illustrating processes 300/400 for measuring a file according to one embodiment of the invention. Processes 300/400 may be performed by processing logic that includes hardware (e.g. circuitry, dedicated logic, etc.), software (e.g., embodied on a non-transitory computer readable medium), or a combination thereof. For example, File Measurement/Change Rate Estimator Module 123, as illustrated in FIGS. 1 and 2, can perform processes 300/400.

Because an estimate of changed_bytes ($F_{Ti}, F_{Tj}$) is based on a count of the number of unique segments written for file F between time $T_i$ and time $T_j$, the file measurement process 300 represents each file F in memory as a set of segments S such that $$S_{Ti} = \{s | s \text{ is a segment of file } F \text{ at time } Ti\} \quad \text{EQ. 1}$$

and $$S_{Tj} = \{s | s \text{ is a segment of file } F \text{ at time } Tj\} \quad \text{EQ.2}$$

where the segments refers to a fingerprint of the content of a unique segment s that belongs to file F and is stored once in a file system with deduplication. It should be noted that throughout this description references to segments refer to a fingerprint of the content of a segment and not to the actual segment stored in the file system unless otherwise specified.

Representing F in memory as a set S of unique segments s is one way to measure the size of F because each of the elements in the set can be counted in order to determine how many unique segments s belong to file F at a given point in time. In actuality, not all of the unique segments s in file F are represented since the storage required to represent all unique segments for every file for which change rate estimation is requested would be too large. Instead, the unique segments selected for inclusion into the set are representative of the number of unique segments belonging to a file F, and the resulting file measurement can be used to derive an approximate size of file F. For example, a count of unique segments included in the set S of unique segments s can be multiplied by the average segment size to derive at least an approximation of the size of file F.

In one embodiment, an efficient data structure for compactly representing in memory a set S of segments s is a bloom filter, referred to as a bitmap B, such that inserting a segment s into the bloom filter results in a corresponding bitmap element bit value of "1."

The process 300 begins at 302 to identify an ad hoc collection or subset of N files F1, . . . FN in the storage system for which change rate estimation is performed. The identification can be based on an input parameter that specifies which subset of N files are to be measured in preparation for change rate estimation. In one embodiment, the specified N files to be measured are protected files for which snapshots are generated for a particular client or tenant of the storage system and/or any other ad hoc collection of N files.

At decision block 304 the process 300 determines whether a file F currently being written is one of the N files. If so, the process 300 next determines at 306 whether the file F is a new or changed file. If so, then at 308 the process generates the file measurement bitmap $B_F$ representing the unique segments in file F (as described in further detail with reference to FIG. 4). Once the bitmap $B_F$ is generated, the process 300 concludes at 310 by optionally compressing and then storing $B_F$ in persistent storage for later use during the change rate estimation process (described in FIGS. 5, 6a-6b).

In one embodiment, process 300 compresses the bitmap $B_F$ efficiently by using a sparse representation. For example, instead of representing the bitmap $B_F$ as a sequence of bits 1s and 0s, if the number of 1s is very low compared to the number of 0s, then the 1s bits can be represented as a series of offsets inside the bitmap $B_F$. For example, if only bit offset 2 and bit offset 3 are set to 1 in a bitmap $B_F$ of size 4, the bitmap $B_F$ is represented compactly as a sequence [2,3] instead of [0,1,1,0].

In one embodiment, the process 300 increases the compression of the bitmap $B_F$ by applying a form of encoding to the bitmap $B_F$, such as delta encoding, in which case the offset of each is bit in the bitmap $B_F$ is represented using differences. For example, [2,4] can be represented as [2,2], since 4=2+2. Other compression techniques that the process 300 can employ include any kind of lossless data compressor such as those from the Lempel-Ziv family of compressors.

An advantage of using process 300 to generate a file measurement for file F is that the actual amount of data required to store the bitmap $B_F$ is proportional to the number of sampled segments in the file F. Thus, smaller files will be measured with a bitmap $B_F$ that requires a smaller number of sampled segments and thus a very small amount of storage, while bigger files will be measured with a bitmap $B_F$ requiring a greater number of sampled segments and thus a larger amount of storage.

With reference to FIG. 4, the process 308 (from FIG. 3) for generating the bitmap measurement of file F is illustrated in further detail in process 400 beginning at 402 with commencing traversing all segments s belonging to file F. In one embodiment, the traversal of the segments in file F is performed at 404 through 408 using a sampling technique until traversal is complete. For example, in one embodiment, at 404 the process 400 samples one unique segments s for every R unique segments in file F.

In one embodiment, to insure proper sampling, process 400 uses a content-based sampling technique instead of sampling randomly (such as when using rand( ) function). A content-based sampling technique selects the segment for insertion into bitmap $B_F$ only if the segment fingerprint matches a particular content-based fingerprint-sampling pattern.

In this manner, the process 400 consistently samples segments without being affected by the frequency with which the segment belongs to files in the storage system. For example, if segment s1 belongs to files F1, . . . FN with a higher frequency than segment s2, content-based sampling avoids the possibility that segment s1 is sampled more often than segment s2.

In one embodiment, after a unique segment of file F is sampled, at 406 the process 300 inserts the sampled segment into bitmap $B_F$ using a corresponding bloom filter insertion hash function. The process 400 continues at 408 repeating traversing and sampling until traversal is complete. Because the process 400 can be performed at either the time the file F is written (or overwritten/changed) or at the time of computing the change rate estimates for any file F that hasn't yet been measured, the process returns control 410 to the measurement process in FIG. 3 or the estimate change rate process in FIG. 6a as appropriate.

Figure 5:
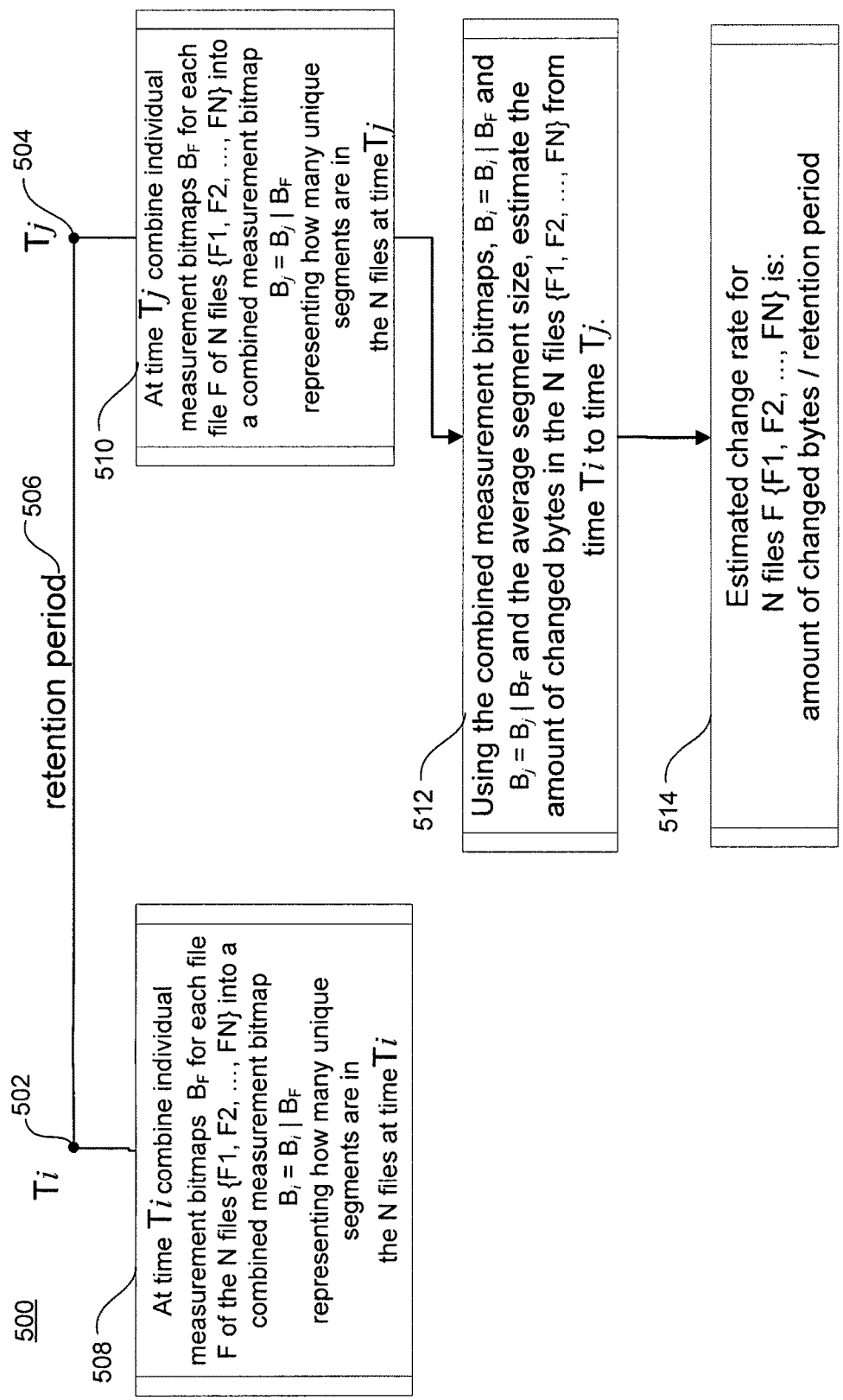
FIG. 5 is a block diagram illustrating processes for change rate estimation in a storage system according to one embodiment of the invention.
Figure 6A:
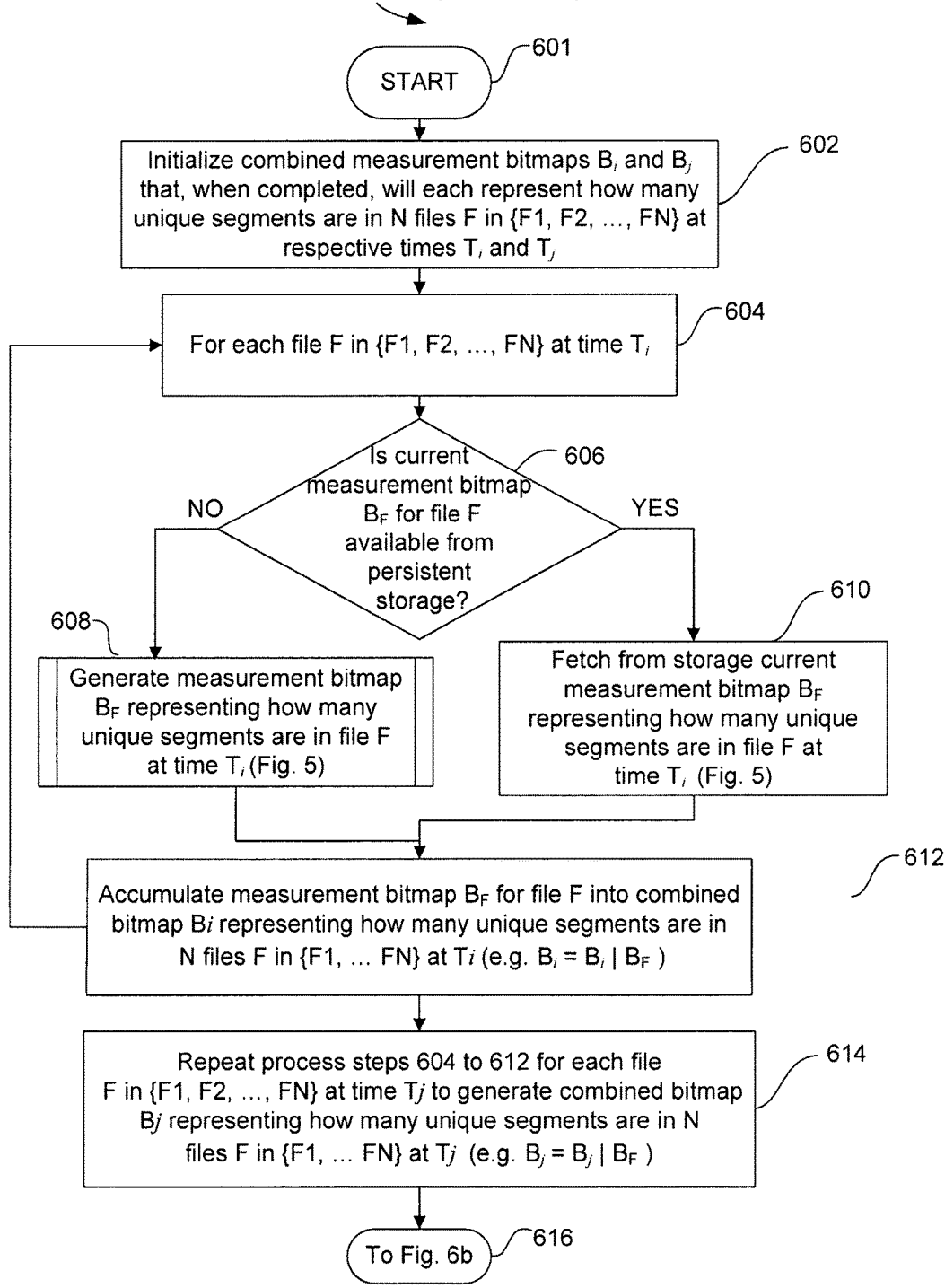
FIGS. 6a-6b are flow diagrams illustrating processes for change rate estimation in a storage system according to one embodiment of the invention.
Figure 6B:
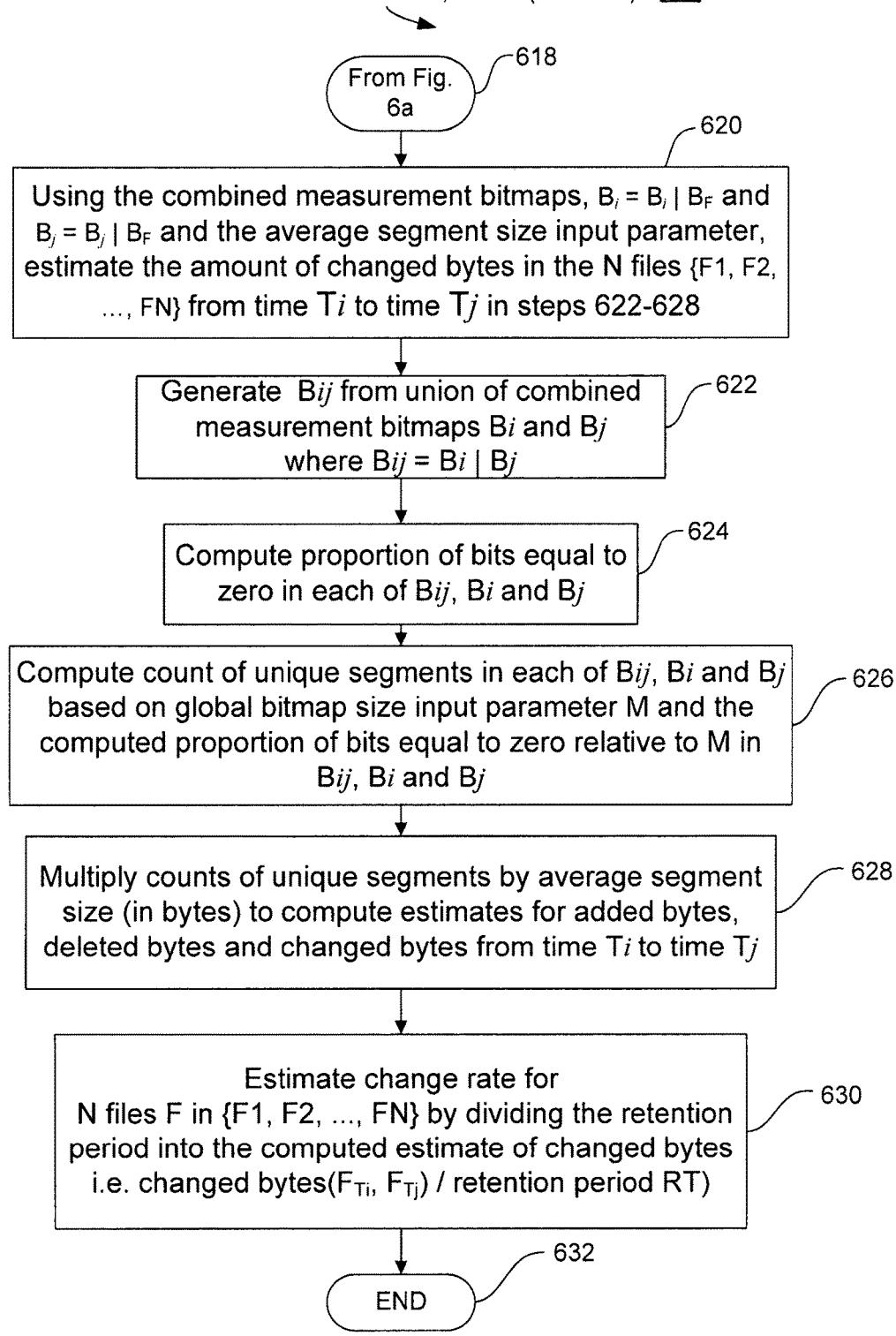

FIG. 5 is a block diagram and FIGS. 6a-6b are flow diagrams, each illustrating certain aspects of processes 500/600 for estimating a change rate of a subset of N files F1, F2, . . . FN according to one embodiment of the invention. Processes 500/600 may be performed by processing logic that includes hardware (e.g. circuitry, dedicated logic, etc.), software (e.g., embodied on a non-transitory computer readable medium), or a combination thereof. For example, File Measurement/Change Rate Estimator Module 123, as illustrated in FIGS. 1 and 2, can perform processes 500/600.

FIG. 5 is a block diagram overview of a process 500 for estimating a change rate in the amount of physical bytes stored for N files {F1, F2, . . . , FN} between any two points in time. In one embodiment, the two points in time are determined from the beginning Ti 502 and ending time Tj 504 associated with a retention period 506 for the N files, e.g. day 1 and day 30 for a retention period of 30 days. Alternatively, the two points in time can be any times such that i<j for any ad hoc collection of N files.

In one embodiment, process 500 performs logic 508 at time Ti to combine individual measurement bitmaps $B_F$ for each file F of the N files {F1, F2, . . . , FN} into a combined measurement bitmap Bi=Bi|$B_F$ representing how many unique segments belong to the N files at time Ti.

Likewise, in one embodiment, process 500 performs logic 510 at time Tj to combine individual measurement bitmaps $B_F$ for each file F of the N files {F1, F2, . . . , FN} into a combined measurement bitmap Bj=Bj|$B_F$ representing how many unique segments belong to the N files at time Tj.

In one embodiment, process 500 performs logic 512 to estimate the amount of changed_bytes in the N files {F1, F2, . . . , FN} from time Ti to time Tj. The process 500 concludes by performing logic 514 to compute the estimated change rate as the estimated amount of changed_bytes divided by the duration of the time period between time Ti to time Tj, e.g. day 1 and day 30 of a retention period, yielding a rate expressed in an amount of changed bytes per day.

FIGS. 6a-6b are flow diagrams that describe a process 600 for estimating the change rate described in FIG. 5 in further detail. As illustrated in FIG. 6a, in one embodiment process 600 begins at 602 to initialize data structures for combined measurement bitmaps Bi and Bj. The initialized bitmaps Bi and Bj have elements that are all 0s. When the process is completed, the bitmaps Bi and Bj efficiently represent in memory how many unique segments belong to N files F in {F1, F2, . . . , FN} at the respective points in time Ti and Tj.

In one embodiment, at 604, for each of N files F in {F1, F2, . . . , FN} at the first point in time Ti, a processing loop is commenced to determine at 606 whether there is an individual measurement bitmap $B_F$ for file F already available. If so, then at 610 the process 600 fetches the individual bitmap $B_F$. Because the individual file measurements of any file F can be completed whenever the file is written (or overwritten) or during an offline generating process, the most current individual file measurement bitmap $B_F$ for any file F may have already been generated. If an individual file measurement bitmap $B_F$ has not yet been generated, then at 608, the process 600 branches to the file measurement processes 300/400 described with reference to FIGS. 3-4 in order to complete this step. Over time, as the file measurement bitmaps $B_F$ are incrementally generated for the subset of N files F stored in the file system, it is anticipated that the number of individual file measurement bitmaps $B_F$ that need to be generated as part of process 600 will diminish, thereby improving the efficiency of the process of estimating the change rate of the subset of N files.

At 612 the processing loop concludes with accumulating the individual file measurement bitmaps $B_F$ for each of N files F in {F1, F2, . . . , FN} into the combined measurement bitmap Bi. The respective bloom filters of $B_F$ and Bi are sets of elements that correspond to sets of segments S as described earlier with reference to processes 300/400 in FIGS. 3-4.

Since one set S of segments can be mathematically combined with another set S of segments using the union U set operator, accumulating the individual file measurement bitmaps $B_F$ for each of N files F in {F1, F2, . . . , FN} into Bi can be mathematically described as a union of the set S of segments for F1 with the set S of segments for F2, and so forth, until all of the individual sets S of segments for F1, F2, . . . FN have been combined into a single set S of segments for the entire subset of N files F in {F1, F2, . . . , FN}

$$S\{F1,F2,\ldots,FN\}=SF1 \cup SF2 \cup \ldots \cup SFN \qquad \text{EQ. 3}$$

Since the union of two sets S is a bitwise "or" function of the corresponding bitmaps, EQ. 3 becomes $$B\{F1,F2,\ldots,FN\}=B_{F1}|B_{F2}\ldots|B_{FN} \qquad \text{EQ. 4}$$

As are the individual bitmaps $B_F$, bitmap Bi is a data structure having the same global size M and the same bloom filter hash function that uniformly distributes the set of ones and zeroes across the bitmap B. Thus, for accumulating the file measurement bitmap $B_F$ into the combined measurement bitmap Bi at time Ti, EQ. 4 can be rewritten as $$Bi=Bi|B_F \text{ for each of } N \text{ files } F \text{ in } \{F1,F2,\ldots,FN\} \qquad \text{EQ. 5}$$

In this manner the process 600 accumulates the set S of unique segments s corresponding to individual file measurements $B_F$ into a single combined set S of unique segments s corresponding to combined file measurement Bi for an entire subset of N files F in {F1, F2, . . . , FN} at time Ti. As such, the combined file measurement bitmap Bi compactly represents in-memory a single combined set S of up to hundreds of billions of unique segments s at time Ti.

In one embodiment, at 614, the process 600 repeats the steps 604-612 for the same subset of N files F in {F1, F2, . . . , FN} at time Tj to generate combined file measurement bitmap Bj for the entire subset of N files F in {F1, F2, ..., FN} at time Tj. As with Bi, the combined file measurement bitmap Bj compactly represents in-memory a single combined set S of up to hundreds of billions of unique segments s at time Tj.

With reference to FIG. 6b, in one embodiment, using the two combined file measurement bitmaps Bi and Bj, the process 600 continues at 620 to carry out a steps 622-628 to compute an estimate of the amount of changed_bytes in the N files {F1, F2, ..., FN} between time Ti and time Tj.

Given the magnitude of the in-memory representation of up to hundreds of billions of unique segments s at a point in time, rather than attempting to compute an exact amount changed_bytes (which would be prohibitively expensive in terms of storage and processing power), the estimate is instead based on computing a count approximating the number of unique segments represented in each of the combined file measurement bitmaps Bi and Bj at the respective points in time Ti and Tj, and estimating a change in the number of unique segments based on the count of unique segments added, the count of unique segments deleted and the average segment size.

Since Bi represents a single combined set S of unique segments s at time Ti, and Bj represents a single combined set S of unique segments s at time Tj, the unique segments added between time Ti and time Tj can be determined from the set of unique segments present at both the start time Ti and finish time Tj, and the set of unique segments present at only the end of the time period at finish time Tj. Likewise, the unique segments deleted between time Ti and time Tj can be determined from the set of unique segments present at both start time Ti and finish time Tj, and the set of unique segments present only at the beginning of the time period at start time Ti. In each case the set of unique segments present at both time Ti and time Tj is equivalent to the set of segments represented in the intersection of Bi and Bj.

Instead of taking the intersection of Bi and Bj to determine a count of the unique segments present at both time Ti and time Tj, the count can be more easily computed by taking the union of the sets represented in bitmaps Bi and Bj, and subtracting the count of the unique segments in the union of Bi and Bj from the sum of counts of unique segments in Bi and Bj alone. Thus, a separate count of the unique segments present at each of the beginning and the end of the time period Ti, Tj is needed to estimate the amount of changed_bytes as well as a combined count of the unique segments present in the union of the sets represented in bitmaps Bi and Bj. For this reason, the process 600 continues at 622 by generating one additional combined measurement bitmap Bij from the union of sets represented in combined measurement bitmaps Bi and Bj which is represented as $S_{Bij}=S_{Bi} \cup S_{Bj}$. Using the bitwise "or" operation, the process 600 computes Bij as follows:

$$Bij=Bi|Bj \qquad \text{EQ. 6}$$

There are now three combined measurement bitmaps in memory:

Bi, a set S of up to hundreds of billions of unique segments s at time Ti,

Bj, a set S of up to hundreds of billions of unique segments s at time Tj, and

Bij, the union of the sets S in Bi and Bj.

Because the hash used to insert segments into Bi, Bj and Bij uniformly distributes segments across the bitmap B, the count of the number of unique segments s present in set S in each of bitmaps Bi, Bj and Bij can be estimated using a statistical set element count technique expressed as $$\text{count}(S)=-M*\ln(z) \qquad \text{EQ. 7}$$

where M is the size of bitmap B (in bits) and z is the proportion of bits set to zero inside bitmap B relative to M, and S is the set of segments s represented in memory in the bitmap B. For example, if z=0.5 and M=20 then 10 bits have 0 value and 10 bits have 1 value inside bitmap B and the count (S) of the number of elements in set S represented in bitmap B is equal to 10.

Thus, with reference to FIGS. 6b, at 624 and 626 the process 600 computes the count of unique segments represented in each of bitmaps Bi, Bj and Bij based on the global bitmap size input parameter M and the respective computed proportion z of bits equal to zero.

In one embodiment, at 624 and 626, the process 600 takes into account whether the individual file measurement bitmaps $B_F$ (from which the combined file measurement bitmaps Bi, Bj and Bij were accumulated) were generated using the sampling techniques described with reference to FIG. 4. If so, then only 1 of every R segments traversed in file F was sampled for inclusion in bitmap $B_F$, and the statistical set element count equation applied to bitmaps Bi, Bj and Bij is modified as follows:

$$\text{count}(S)=-R*M*\ln(z) \qquad \text{EQ. 8}$$

where M is the size of bitmap B (in bits), z is the proportion of bits set to zero inside bitmap B relative to M, S is the set of segments s represented in memory in the bitmap B, and R is the sampling rate at which segments are sampled for inclusion in the bitmap B. For example, if z=0.5 and M=20 then 10 bits have 0 value and 10 bits have 1 value inside bitmap B. If the sampling rate R is 10, then the count (S) of the number of elements in set S represented in bitmap B is equal to 100.

In one embodiment, at 628, the process 600 uses the counts computed at 624 and 626 to determine how many unique segments were added between time Ti and time Tj, how many unique segments were deleted between time Ti and time Tj, and the change in the number of unique segments between time Ti and time Tj based on how many were added and deleted.

For example, in one embodiment the count of the unique segments present at both the beginning and the end of the time period Ti, Tj, i.e. the retained segment count of the intersection (Bi∩Bj), can be expressed as $$\text{retained segment count}=\text{count}(Bi)+\text{count}(Bj)-\text{count}(Bij) \qquad \text{EQ. 9}$$

The retained segment count can be subtracted from the count of the unique segments present at the end of the time period Tj to obtain a count of added unique segments, expressed as $$\text{added segment count}=\text{count}(Bj)-\text{retained segment count} \qquad \text{EQ. 10}$$

The retained segment count can be subtracted from the count of the unique segments present at the beginning of the time period Ti to obtain a count of deleted unique segments, expressed as $$\text{deleted segment count}=\text{count}(Bi)-\text{retained segment count} \qquad \text{EQ. 11}$$

In one embodiment, the changed segment amount can be obtained by adding the deleted segment count to the added segment count.

$$\text{changed segment amount}=\text{added segment count}+\text{deleted segment count} \qquad \text{EQ. 12}$$

For example, in a small bitmap B of size M=8 consider $Bi$=[11111000]

$Bj$=[11011110]

$Bij$=[11111110]

The count of unique segments at the beginning of the time period, count(Bi) is 5 and at the end of the time period count(Bj) is 6, yielding a count(Bij) of 7. A total of 4 segments were retained (in common to both Bi and Bj) as calculated by EQ. 9 (and confirmed in this simple example by visual inspection because 4 locations [1, 2, 4, 5] in bitmap B are set to one at both the beginning and the end of the time period). In this case two segments were added (at positions 6 and 7 of bitmap B) and one segment was deleted (at position 3 of bitmap B) yielding a changed segment amount of 3.

In the above example, if Bi is unchanged but Bj= [10011111], then:

$Bi$=[11111000]

$Bj$=[10011111]

$Bij$=[11011111]

Again, the count of unique segments at the beginning of the time period, count(Bi) is 5 and at the end of the time period count(Bj) is 6, yielding a count(Bij) of 7. This time a total of 3 segments were retained (in common to both Bi and Bj) as calculated by EQ. 9 (and confirmed in this simple example by visual inspection because 3 locations [1, 4, 5] in bitmap B are set to one at both the beginning and the end of the time period). In this case three segments were added (at positions 6, 7 and 8 of bitmap B) and two segments were deleted (at positions 2 and 3 of bitmap B) yielding a changed segment amount of 5.

At 628, the process 600 computes the changed_bytes from time period Tj to time period Tj ({F1, F2, ..., FN}Ti, {F1, F2, ..., FN}Tj) using the average segment size input parameter as follows:

$$\text{changed\_bytes} = \text{changed segment amount} * \text{avg\_s\_size} \quad \text{EQ. 13}$$

In one embodiment, in order to estimate the change rate for N files F in {F1, F2, ..., FN} at 630 the process 600 divides the time period (e.g. the retention period RT) into the computed estimate of changed_bytes, where the change rate is expressed as a number of physical bytes per unit of time.

In one embodiment, instead of computing the changed segment amount to determine the amount of changed_bytes, the process computes estimates for added bytes and deleted bytes, and then uses the added and deleted bytes to directly compute the amount of changed_bytes. An example of equations used to compute the changed_bytes in this manner is as follows:

$$\text{added bytes}(\{F1,F2, \ldots ,FN\}Ti,\{F1,F2, \ldots ,FN\}Tj) = (\text{count}(Bj) - (\text{count}(Bj) + \text{count}(Bi) - \text{count}(Bij))) * \text{avg\_s\_size} = (\text{count}(Bij) - \text{count}(Bi)) * \text{avg\_s\_size} \quad \text{EQ. 14}$$

$$\text{deleted bytes}(\{F1,F2, \ldots ,FN\}Ti,\{F1,F2, \ldots ,FN\}Tj) = (\text{count}(Bi) - (\text{count}(Bj) + \text{count}(Bi) - \text{count}(Bij))) * \text{avg\_s\_size} = (\text{count}(Bij) - \text{count}(Bj)) * \text{avg\_s\_size} \quad \text{EQ. 15}$$

$$\text{changed\_bytes}(\{F1,F2, \ldots ,FN\}Ti,\{F1,F2, \ldots ,FN\}Tj) = \text{added bytes}(\{F1,F2, \ldots ,FN\}Ti,\{F1,F2, \ldots ,FN\}Tj) + \text{deleted bytes}(\{F1,F2, \ldots ,FN\}Ti,\{F1,F2, \ldots ,FN\}Tj) \quad \text{EQ. 16}$$

Upon computing the change rate at 632, process 600 is complete. In one embodiment, in the next measurement period the process 600 is repeated as needed in order to update the change rate for a particular ad hoc collection of N files F with the latest values. In one embodiment, the change rate may be updated periodically at predetermined intervals or on demand.

In the foregoing description note that some or all of the components as shown and described above, such as the File Measurement/Change Rate Estimator Module 123 in FIGS. 1 and 2 and associated logic as described in FIGS. 3-5, and FIGS. 6a-6b, may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
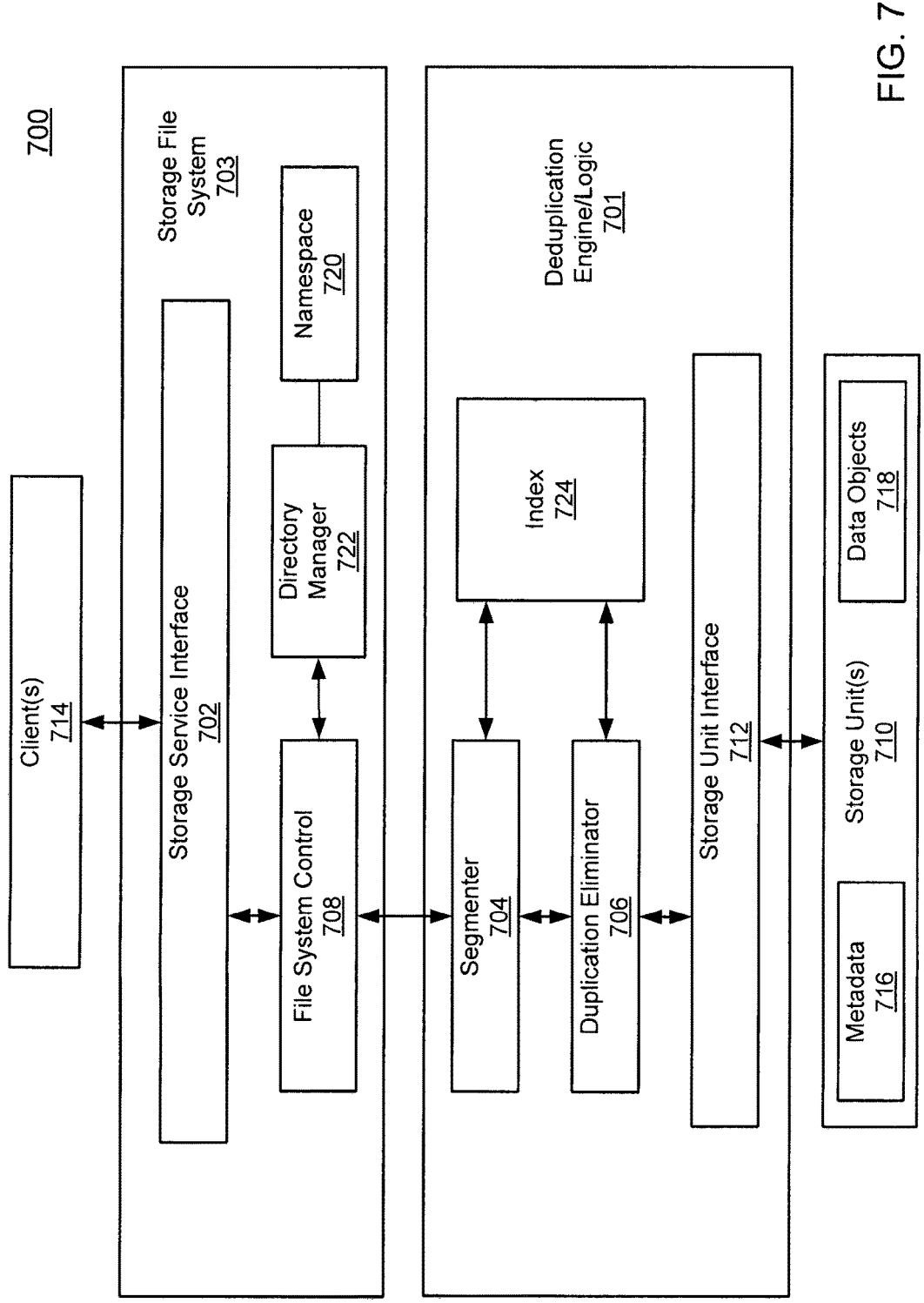
FIG. 7 is a block diagram illustrating a deduplication storage system according to one embodiment of the invention.

FIG. 7 is a block diagram illustrating a deduplication storage system according to one embodiment of the invention. For example, deduplication storage system 700 is implemented as part of the storage system 700 as described above, such as, for example, the deduplication storage system as a client and/or a server described above. In one embodiment, storage system 700 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 700 may have a distributed architecture, or all of its components may be integrated into a single unit. Storage system 700 may be implemented as part of an archive and/or backup system, or a disaster recovery system, such as a deduplicating storage system available from EMC® Corporation of Hopkinton, Mass.

In one embodiment, storage system 700 includes deduplication logic 701 interfacing one or more clients 714, via file system 703, with one or more storage units 710 storing metadata 716 and data objects 718. Clients 714 may be any kinds of clients, such as, for example, a client application, backup software, a garbage collector, or a storage management function, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 710 may be implemented locally (e.g., single node operating environment) or remotely (e.g., multi-node operating environment) via an interconnect, which may be a bus and/or a network (e.g., a storage network). In one embodiment, one of storage units 710 operates as an active storage to receive and store external or fresh user data from a client (e.g., an end-user client or a primary storage system associated with one or more end-user clients), while the another one of storage units 710 operates as a target storage unit to periodically archive data from the active storage unit according to an archiving policy or scheme.

Storage units 710 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 710 may also be combinations of such devices. In the case of disk storage media, the storage units 710 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 716, may be stored in at least some of storage units 710, such that files can be accessed independent of another storage unit. Metadata of each storage unit includes enough information to provide access to the files it contains. In one embodiment, metadata may include fingerprints or representatives contained within data objects 718, where a data object may represent a data segment (also referred to as a data chunk), a compression region (CR) of one or more data segments, or a container of one or more CRs. Fingerprints are mapped to a particular data object via metadata 716, enabling the system to identify the location of the data object containing a data segment represented by a particular fingerprint. A fingerprint may be generated based on at least a portion of a data segment, for example, by applying a predetermined mathematical algorithm (e.g., hash function) to at least a portion of the content of the data segment. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 716 may include a file name, a storage unit identifier (ID) identifying a storage unit in which the segments associated with the file name are stored, reconstruction information for the file using the segments, and any other appropriate metadata information. Metadata 716 may further include a segment ID, a segment sketch, a hash of a segment, an encrypted hash of a segment, random data, or any other appropriate metadata. In some embodiments, metadata associated with a segment is used to identify identical and/or similar data segments. The stored metadata enables a faster identification of identical and/or similar data segments as an ID and/or sketch (e.g., a set of values characterizing the segment) do not need to be recomputed for the evaluation of a given incoming data segment.

In one embodiment, a segment ID includes one or more deterministic functions of a data segment (also referred to as a data segment), one or more hash functions of a data segment, random data, or any other appropriate data segment ID. In various embodiments, a data segment sketch includes one or more deterministic functions of a data segment, one or more hash functions of a data segment, one or more functions that return the same or similar value for the same or similar data segments (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a segment. For example, a sketch may be generated by applying one or more functions (e.g., hash functions) on a segment and a subset of the results of the functions performed on the segment (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, file system 703 includes file service interface 702, file system control logic 708, directory manager 722, and namespace 720. Deduplication logic 701 includes segmenter 704 (also referred to as a segmenting module or unit), duplication eliminator 706, and storage unit interface 712. File system control 708 receives a file or files (or data item(s)) via file service interface 702, which may be part of a file system namespace 720 of file system 703 associated with the deduplication logic 701. The file system namespace 720 refers to the way files are identified and organized in the system. An example is to organize the files hierarchically into directories or folders, which may be managed by directory manager 722. File service interface 712 supports a variety of protocols, including a network file system (NFS), a common Internet file system (CIFS), a direct access file system (DAFS), Hadoop distributed file system (HDFS), and a virtual tape library interface (VTL), etc.

The file(s) is/are processed by segmenter 704 and file system control 708. Segmenter 704, also referred to as a content store, breaks the file(s) into variable-length segments based on a variety of rules or considerations. For example, the file(s) may be broken into segments by identifying segment boundaries. Segment boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more segments that originally made up a data block, data stream, file, or directory that was/were previously stored.

In some embodiments, segments are segmented by identifying segment boundaries that are content-based, such as, for example, a hash function is applied to values of data within a sliding window through the data stream or block and when the hash function is equal to a value (or equal to one of several values) then a segment boundary is identified. In various embodiments, segment boundaries are identified using content based functions operating on a sliding window within a data stream or block that have a minimum or maximum or other value or any other appropriate content based segmenting algorithm. In various embodiments, segments include fixed-length segments, variable length segments, overlapping segments, non-overlapping segments, segments with a minimum size, segments with a maximum size, or any other appropriate segments. In various embodiments, segments include files, groups of files, directories, a portion of a file, a portion of a data stream with one or more boundaries unrelated to file and/or directory boundaries, or any other appropriate segment.

In one embodiment, a segment boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 708, also referred to as a file system manager, processes information to indicate the segment(s) association with a file. In some embodiments, a list of fingerprints is used to indicate segment(s) associated with a file. File system control 708 passes segment association information (e.g., representative data such as a fingerprint) to index 724. Index 724 is used to locate stored segments in storage units 710 via storage unit interface 712. In one embodiment, index 724 may include multiple entries, each entry corresponding one of the deduplicated segments. Each entry maps a representative or fingerprint of a deduplicated segment to a storage location identifier identifying a storage location storing the corresponding deduplicated segment. In one embodiment, each entry of index 724 maps a fingerprint of a segment to a container identifier identifying a container that contains the corresponding segment.

In one embodiment, index 724 includes a persistent hash-table of segment-IDs keyed either by the digest of the data stored in the segment or by the deduplication key of the data stored in the segment. The index 724 need not contain entries for every data segment in the deduplication domain, but the effectiveness of deduplication is a function of the number of entries stored in the index 724. Deduplication of data happens in two logically distinct operations: detection and remapping. The detection operation identifies blocks containing the same data. The remapping operation updates address maps that record physical locations of logical units of data so that a single block of data is shared by multiple logical units (LUNs) or by multiple positions within the same LUN. Detection is accomplished by building a database (e.g., index 724) that maintains a digest (e.g., SHA, checksum) and a deduplication key for each data block. When two data blocks have the same digest they have a sufficiently high probability of containing the same data to warrant a bit-for-bit comparison to confirm they are exact duplicates. Remapping leverages dynamic block-mapping technology of a file system mapping driver. A file system allows dynamic manipulation of the address maps that connects LUN's logical address space to its physical address space.

Duplication eliminator 706, also referred to as a segment store, identifies whether a newly received segment has already been stored in storage units 710. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 710 that make up the file. Segments are then packed by a container manager (which may be implemented as part of storage unit interface 712) into one or more storage containers stored in storage units 710. The deduplicated segments may be further compressed into one or more CRs using a variation of compression algorithms, such as a Lempel-Ziv algorithm before being stored. A container may contain one or more CRs and each CR may contain one or more deduplicated segments (also referred to deduplicated segments). A container may further contain the metadata such as fingerprints, sketches, type of the data segments, etc. that are associated with the data segments stored therein.

When a file is to be retrieved, file service interface 702 is configured to communicate with file system control 708 to identify appropriate segments stored in storage units 710 via storage unit interface 712. Storage unit interface 712 may be implemented as part of a container manager. File system control 708 communicates (e.g., via segmenter 704) with index 724 to locate appropriate segments stored in storage units via storage unit interface 712. Appropriate segments are retrieved from the associated containers via the container manager and are used to construct the requested file. The file is provided via interface 702 in response to the request. In one embodiment, file system control 708 utilizes a tree (e.g., a segment tree obtained from namespace 720) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

In one embodiment, storage system 700 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Note that some or all of the components as shown and described above (e.g., deduplication logic 701) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into a dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
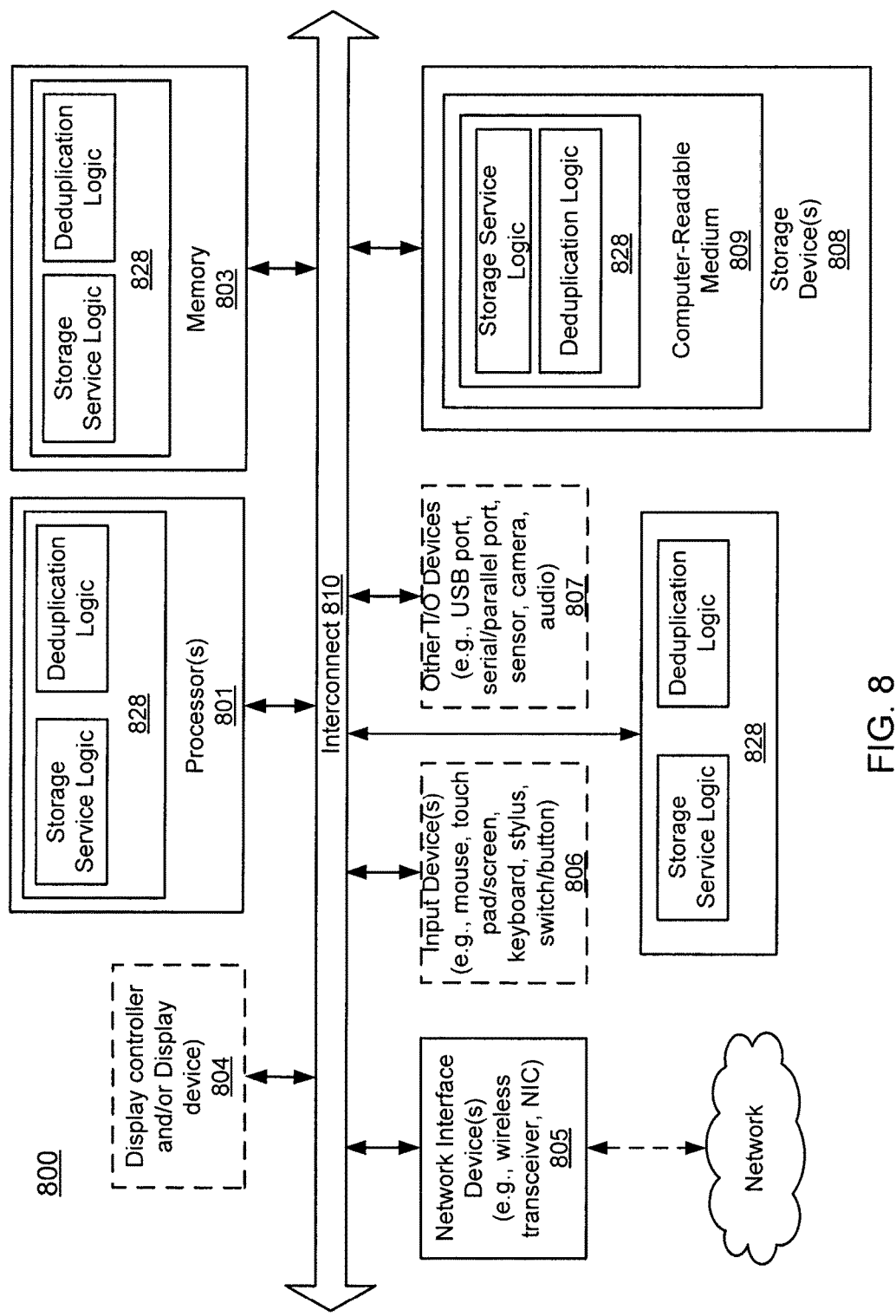
FIG. 8 is a block diagram illustrating a data processing system according to one embodiment of the invention.

FIG. 8 is a block diagram illustrating an example of a data processing system that may be used with one embodiment of the invention. For example, system 800 may represents any of data processing systems described above performing any of the processes or methods described above. System 800 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 800 is intended to show a high level view of many components of the computer system. However, it is to be understood that additional components may be present in certain implementations and furthermore, different arrangement of the components shown may occur in other implementations. System 800 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 800 includes processor 801, memory 803, and devices 805-808 via a bus or an interconnect 810. Processor 801 may represent a single processor or multiple processors with a single processor core or multiple processor cores included therein. Processor 801 may represent one or more general-purpose processors such as a microprocessor, a central processing unit (CPU), or the like. More particularly, processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 801, which may be a low power multi-core processor socket such as an ultra-low voltage processor, may act as a main processing unit and central hub for communication with the various components of the system. Such processor can be implemented as a system on chip (SoC). Processor 801 is configured to execute instructions for performing the operations and steps discussed herein. System 800 may further include a graphics interface that communicates with optional graphics subsystem 804, which may include a display controller, a graphics processor, and/or a display device.

Processor 801 may communicate with memory 803, which in one embodiment can be implemented via multiple memory devices to provide for a given amount of system memory. Memory 803 may include one or more volatile storage (or memory) devices such as random access memory (RAM), dynamic RAM (DRAM), synchronous DRAM (SDRAM), static RAM (SRAM), or other types of storage devices. Memory 803 may store information including sequences of instructions that are executed by processor 801, or any other device. For example, executable code and/or data of a variety of operating systems, device drivers, firmware (e.g., input output basic system or BIOS), and/or applications can be loaded in memory 803 and executed by processor 801. An operating system can be any kind of operating systems, such as, for example, Windows® operating system from Microsoft®, Mac OS/iOS from Apple, Android® from Google®, Linux®, Unix®, or other real-time or embedded operating systems such as VxWorks.

System 800 may further include IO devices such as devices 805-808, including network interface device(s) 805, optional input device(s) 806, and other optional IO device(s) 807. Network interface device 805 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 806 may include a mouse, a touch pad, a touch sensitive screen (which may be integrated with display device 804), a pointer device such as a stylus, and/or a keyboard (e.g., physical keyboard or a virtual keyboard displayed as part of a touch sensitive screen). For example, input device 806 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 807 may include an audio device. An audio device may include a speaker and/or a microphone to facilitate voice-enabled functions, such as voice recognition, voice replication, digital recording, and/or telephony functions. Other IO devices 807 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 807 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 810 via a sensor hub (not shown), while other devices such as a keyboard or thermal sensor may be controlled by an embedded controller (not shown), dependent upon the specific configuration or design of system 800.

To provide for persistent storage of information such as data, applications, one or more operating systems and so forth, a mass storage (not shown) may also couple to processor 801. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 801, e.g., via a serial peripheral interface (SPI). This flash device may provide for non-volatile storage of system software, including a basic input/output software (BIOS) as well as other firmware of the system.

Storage device 808 may include computer-accessible storage medium 809 (also known as a machine-readable storage medium or a computer-readable medium) on which is stored one or more sets of instructions or software (e.g., module, unit, and/or logic 828) embodying any one or more of the methodologies or functions described herein. Module/unit/logic 828 may also reside, completely or at least partially, within memory 803 and/or within processor 801 during execution thereof by data processing system 800, memory 803 and processor 801 also constituting machine-accessible storage media. Module/unit/logic 828 may further be transmitted or received over a network via network interface device 805.

Computer-readable storage medium 809 may also be used to store the some software functionalities described above persistently. While computer-readable storage medium 809 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 828, components and other features described herein can be implemented as discrete hardware components or integrated in the functionality of hardware components such as ASICS, FPGAs, DSPs or similar devices. In addition, module/unit/logic 828 can be implemented as firmware or functional circuitry within hardware devices. Further, module/unit/logic 828 can be implemented in any combination hardware devices and software components.

Note that while system 800 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for determining storage requirements for storing a subset of files in a storage system with deduplication, the method comprising:
   at a first point in time accumulating individual file measurements for each file in a subset of files into an initial measurement for the subset of files, the initial measurement representing an approximate number of unique segments belonging to the subset of files at the first point in time, the approximate number of unique segments represented in the initial measurement being different from an exact number of unique segments belonging to the subset of files at the first point in time;
   at a second point in time accumulating individual file measurements for each file in the subset of files into a final measurement for the subset of files, the final measurement representing an approximate number of unique segments belonging to the subset of files at the second point in time, the approximate number of unique segments represented in the final measurement being different from an exact number of unique segments belonging to the subset of files at the second point in time;
   computing a changed segment estimate based on a comparison of the approximate numbers of unique segments represented in the initial and final measurements;
   determining a rate of change in an amount of storage required to store the subset of files in the storage system between the first and second points in time based on the amount of storage required to store a quantity of unique segments represented by the changed segment estimate; and
   wherein the amount of storage required to store a quantity of unique segments represented by the changed segment estimate is computed based on an average size of unique segments stored in the storage system.

2. The computer-implemented method of claim 1, wherein a file measurement for a file F in the subset of files is stored in memory in a bitmap vector $B_F$ containing a set of ones and zeroes representing an approximate number of unique segments belonging to the file F at the time the file was measured.

3. The computer-implemented method of claim 2 further comprising generating the bitmap vector $B_F$ using a bloom filter, the generating including:
   receiving a selection of a subset of N files for which the rate of change is to be determined;
   determining that a file F being written is one of the files in the subset of N files and is new or changed;
   traversing unique segments s belonging to the file F;
   sampling one of every R unique segments traversed; and
   inserting each sampled one of every R unique segments into $B_F$ using the bloom filter.

4. The computer-implemented method of claim 3, wherein the initial and final measurements of the subset of files are stored in memory in bitmap vector Bi and bitmap vector Bj, i representing the first point in time and j representing the second point in time, the bitmap vectors Bi and Bj containing:
   a set of ones and zeroes representing an approximate number of unique segments belonging to the subset of files at the first and second points in time, respectively, the sets of ones and zeroes having been derived from a union of the corresponding sets in the bitmap vector $B_F$ stored in the file measurements for each file in the subset of files at the first and second points in time, respectively.

5. The computer-implemented method of claim 4, wherein the bloom filter has a single hash function that uniformly distributes the set of ones and zeroes across the bitmap vector $B_F$.

6. The computer-implemented method of claim 5, further comprising:
   counting the approximate number of unique segments that belong to file F based on a size M of the bitmap vector $B_F$ and a proportion z of bits set to zero in the bitmap vector $B_F$ relative to the size M.

7. The computer-implemented method of claim 5, further comprising:
   counting the approximate number of unique segments that belong to each of the subset of files at the first and second points in time based on a size M of the bitmap vector Bi and bitmap vector Bj, respectively and the proportion z of bits set to zero in the bitmap vector Bi and bitmap vector Bj relative to the size M, respectively.

8. A non-transitory computer-readable storage medium having instructions stored therein, which when executed by a processor, cause the processor to perform operations for determining storage requirements for storing a subset of files in a storage system with deduplication, the operations comprising:
   at a first point in time accumulating individual file measurements for each file in a subset of files into an initial measurement for the subset of files, the initial measurement representing an approximate number of unique segments belonging to the subset of files at the first point in time, the approximate number of unique segments represented in the initial measurement being different from an exact number of unique segments belonging to the subset of files at the first point in time;
   at a second point in time accumulating individual file measurements for each file in the subset of files into a final measurement for the subset of files, the final measurement representing an approximate number of unique segments belonging to the subset of files at the second point in time, the approximate number of unique segments represented in the final measurement being different from an exact number of unique segments belonging to the subset of files at the second point in time;
   computing a changed segment estimate based a comparison of the approximate numbers of unique segments represented in the initial and final measurements;
   determining a rate of change in an amount of storage required to store the subset of files in the storage system between the first and second points in time based on the amount of storage required to store a quantity of unique segments represented by the changed segment estimate; and wherein the amount of storage required to store a quantity of unique segments represented by the changed segment estimate is computed based on an average size of unique segments stored in the storage system.

9. The non-transitory computer-readable storage medium of claim 8, wherein a file measurement for a file F in the subset of files is stored in memory in a bitmap vector $B_F$ containing a set of ones and zeroes representing an approximate number of unique segments belonging to the file F at the time the file was measured.

10. The non-transitory computer-readable storage medium of claim 9, wherein the operations further comprise:
generating the bitmap vector $B_F$ using a bloom filter, the generating including:
receiving a selection of a subset of N files for which the rate of change is to be determined;
determining that a file F being written is one of the files in the subset of N files and is new or changed;
traversing unique segments s belonging to the file F;
sampling one of every R unique segments traversed; and
inserting each sampled one of every R unique segments into $B_F$ using the bloom filter.

11. The non-transitory computer-readable storage medium of claim 10, wherein the initial and final measurements of the subset of files are stored in memory in bitmap vector Bi and bitmap vector Bj, i representing the first point in time and j representing the second point in time, the bitmap vectors Bi and Bj containing:
a set of ones and zeroes representing an approximate number of unique segments belonging to the subset of files at the first and second points in time, respectively, the sets of ones and zeroes having been derived from a union of the corresponding sets in the bitmap vector $B_F$ stored in the file measurements for each file in the subset of files at the first and second points in time, respectively.

12. The non-transitory computer-readable storage medium of claim 11, wherein the operations further comprise:
counting the approximate number of unique segments that belong to file F based on a size M of the bitmap vector $B_F$ and a proportion z of bits set to zero in the bitmap vector $B_F$ relative to the size M.

13. The non-transitory computer-readable storage medium of claim 11, wherein the operations further comprise:
counting the approximate number of unique segments that belong to each of the subset of files at the first and second points in time based on a size M of the bitmap vector Bi and bitmap vector Bj, respectively and the proportion z of bits set to zero in the bitmap vector Bi and bitmap vector Bj relative to the size M, respectively.

14. A data processing system, comprising:
a persistent memory in which to store individual file measurements for each file in a subset of files;
a memory in which to store:
an initial measurement for the subset of files, the initial measurement representing an approximate number of unique segments belonging to the subset of files at a first point in time the approximate number of unique segments represented in the initial measurement being different from an exact number of unique segments belonging to the subset of files at the first point in time, and
a final measurement for the subset of files, the final measurement representing an approximate number of unique segments belonging to the subset of files at the second point in time, the approximate number of unique segments represented in the final measurement being different from an exact number of unique segments belonging to the subset of files at the second point in time; and
a processor in communication with the persistent memory and the memory, the processor configured to:
accumulate the individual file measurements for each file in the subset of files into the initial measurement for the subset of files at the first point in time;
accumulate the individual file measurements for each file in the subset of files into the final measurement for the subset of files at the second point in time;
compute a changed segment estimate based a comparison of the approximate numbers of unique segments represented in the initial and final measurements;
determine a rate of change in an amount of storage required to store the subset of files in the storage system between the first and second points in time based on the amount of storage required to store a quantity of unique segments represented by the changed segment estimate; and
wherein the processor is further configured to compute the amount of storage required to store a quantity of unique segments represented by the changed segment estimate based on an average size of unique segments stored in the storage system.

15. The data processing system of claim 14, wherein individual file measurements stored for each file in the subset of files is a bitmap vector $B_F$ containing a set of ones and zeroes representing an approximate number of unique segments belonging to a file F at the time the file was measured.

16. The data processing system of claim 15, wherein the processor is further configured to generate the bitmap vector $B_F$ using a bloom filter, including to:
receive a selection of a subset of N files for which the rate of change is to be determined;
determine that a file F being written is one of the files in the subset of N files and is new or changed;
traverse unique segments s belonging to the file F;
sample one of every R unique segments traversed; and
insert each sampled one of every R unique segments into $B_F$ using the bloom filter.

17. The data processing system of claim 15, wherein the initial and final measurements stored for the subset of files are bitmap vector Bi and bitmap vector Bj, i representing the first point in time and j representing the second point in time, the bitmap vectors Bi and Bj containing:
a set of ones and zeroes representing an approximate number of unique segments belonging to the subset of files at the first and second points in time, respectively, the sets of ones and zeroes having been derived from a union of the corresponding sets in the bitmap vector $B_F$ stored in the file measurements for each file in the subset of files at the first and second points in time, respectively.

18. The data processing system of claim 15, wherein the processor is further configured to count the approximate number of unique segments that belong to file F based on a size M of the bitmap vector $B_F$ and a proportion z of bits set to zero in the bitmap vector $B_F$ relative to the size M.

19. The data processing system of claim 17, wherein the processor is further configured to count the approximate number of unique segments that belong to each of the subset of files at the first and second points in time based on a size M of the bitmap vector Bi and bitmap vector Bj, respectively and the proportion z of bits set to zero in the bitmap vector Bi and bitmap vector Bj relative to the size M, respectively.

* * * * *